3,054,785
PHOSPHORUS CONTAINING POLYMERS AND METHOD FOR THE PREPARATION THEREOF
Robert H. Wade, Altadena, Calif., assignor to Minnesota Mining and Manufacturing Company, St. Paul, Minn., a corporation of Delaware
No Drawing. Filed Dec. 5, 1958, Ser. No. 778,294
22 Claims. (Cl. 260—92.1)

This invention relates to new and useful halogen-containing polymers and their preparation. In one aspect, this invention relates to a method for preparing halogen-containing polymers, especially the perhalogenated polymers. In another aspect, the invention relates to new polymers of trifluorochloroethylene.

For the purpose of this invention the term "polymer" includes both homopolymers and copolymers. The term "homopolymer" refers to those polymeric materials containing the same monomeric units. The term "copolymers" refers to those polymeric materials containing monomer units of two or more different monomers. The terms "polymerization" in its broadest sense include both homopolymerization and copolymerization.

Liquid, grease and wax-like polymers, particularly the polymers of the fluoroethylenic and chlorofluoroethylenic monomers, may be used in such capacities as plasticizers for various polymers, particularly the halogen-containing polymers, rubber softeners, non-inflammable hydraulic fluids, heat transfer media, lubricants of all types, dielectric fluids for insulating purposes, and potting compounds. The higher molecular weight or normally solid polymers, particularly the polymers of the fluoroethylenic and chlorofluoroethylenic monomers, may be used in such capacities as a heat and chemical resistant film or coating on metal, plastics, and fibrous material, as solid dielectrics, etc.

An object of the present invention is to provide polymeric material containing new terminal groups.

Another object of this invention is to provide distillable liquid, oil, grease and wax-like polymers containing new terminal groups.

Still another object of this invention is to provide normally solid, high molecular weight polymeric materials containing new terminal groups.

Another object of this invention is to provide polymeric compounds having terminal groups capable of being hydrolyzed to form a substituted acid.

A further object of this invention is to provide a method for preparing polymeric material containing new terminal groups.

Various other objects and advantages will become apparent to those skilled in the art from the accompanying description and disclosure.

According to this invention, a halogen-containing monomer, or monomers, is polymerized with a phosphorus halide in the presence of a catalyst, to produce an open chain polymer. The phosphorus halide provides the terminal groups, tends to control polymerization and gradually modifies free radical reaction. By varying the amount of halide used, the molecular weight of the polymeric material may be varied to produce oils, greases, waxes or solids.

The phosphorus halide is selected from a group of phosphorus halides of the formula $$PX_n$$

where X is a halogen selected from the group consisting of chlorine, iodine and bromine, and $n$ is either 3 or 5. Typical examples of these phosphorus halides are phosphorus tribromide, phosphorus pentabromide, phosphorus trichloride, phosphorus pentachloride and phosphorus triiodide. It is also within the scope of this invention to use mixed halides, such as phosphorus bromotrichloride.

Generally accepted among those skilled in the art is the concept that compounds that will readily homopolymerize are those that contain $=CH_2$ and/or $=CF_2$ groups.

It is also well known that compounds which will not readily homopolymerize may be copolymerized with other monomers. The haloolefinic compounds which may be used as starting materials in the present invention are polymerizable compounds containing a double bond between two carbon atoms and at least one halogen atom attached to at least one of the carbon atoms attached to the double bond. The halogen attached to the carbon of the double bond may be fluorine, chlorine, bromine or iodine.

The present invention is particularly applicable to the polymerization of perfluorochloroolefins, such as chlorotrifluoroethylene, perfluoro olefins such as tetrafluoroethylene, chloro olefins such as vinyl chloride, and fluoro olefins such as vinylidene fluoride. The invention contemplates the polymerization of various polymerizable halogenated olefins, preferably having not more than 8 carbon atoms per molecule; for example, perfluorobutadiene, alpha-methyl phenyldifluoroethylene, difluorodichloroethylene, perfluoroacrylonitrile, alpha-B,B-trifluorostyrene, perfluorocyclobutene, alpha-chloro-styrene, 2-chloropropene, vinylidene chloride, vinyl bromide, tetrachloropropene, chlorobutadiene, alpha-bromostyrene, bromotrifluoroethylene, unsymmetrical dibromodifluoroethylene, perfluoropropene, trifluoroethylene, and vinyl fluoride. As previously mentioned, this invention applies to the copolymerization of these monomers or of these monomers with other monomers, as well as their homopolymerization. For example, the invention applies to the copolymerization of chlorotrifluoroethylene and tetrafluoroethylene, and vinylidene fluoride and chlorotrifluoroethylene. In the copolymerization, the second monomer or comonomer is a halogenated olefin, and preferably a halogenated olefin in which the halogen is selected from a group consisting of chlorine and fluorine. The monomers may also be copolymerized with a wide range of compounds which do not readily homopolymerize. For example, the invention contemplates the copolymerization of compounds of the nature of sym. dichlorodifluoroethylene, perfluoropropene and trichloroethylene with such more readily polymerizable monomers as chlorotrifluoroethylene, vinylidene fluoride and tetrafluoroethylene. Generally, ethylenically unsaturated aliphatic monomers having from 2 to 3 carbon atoms are preferred, with the ethylenic monomers being particularly preferred.

The compounds formed by the polymerization of halogen-containing olefinic monomers in the presence of a phosphorus halide have the general formulae:

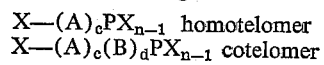

$X-(A)_cPX_{n-1}$ homotelomer
$X-(A)_c(B)_dPX_{n-1}$ cotelomer wherein X is a halogen selected from the group consisting of chlorine, bromine and iodine; A and B are different halogen-containing olefinic monomer units; $c$ and $d$ are integers greater than one and preferably total together not greater than about 250; and $n$ is either 3 or 5. The monomer units of the polymer have the same structure as the compound polymerized except that one double bond for each monomer is converted to a single bond. Generally, $c$ or $(c+d)$ values above about 30 correspond to solid high molecular weight material, and $c$ or $(c+d)$ values below about 30 correspond to oils, greases and waxes.

It is also within the scope of this invention that a halogen, such as iodine, of the monomer unit may be replaced with another halogen donated by the phosphorus halide concurrently with the polymerization reaction. In the case of dienes as monomers, double bonds may be halogenated concurrently with the polymerization reaction.

The present invention is not limited to use in any one particular type system or apparatus. In one aspect, the polymerization may be carried out by means of a batch process which comprises polymerizing the monomer in the presence of a catalyst, a phosphorus halide, and an inert solvent, such as trichlorotrifluoroethane (Freon 113), if desired, under autogenous pressure.

More particularly, a system designed to withstand moderate pressures, which are autogenous during the polymerization is flushed out with nitrogen to remove any oxygen and subsequently charged with the catalyst, preferably benzoyl peroxide, a phosphorus halide, and a solvent, if desired. The system is closed, and the haloethylenic monomer, is added as a gas under pressure or as a liquid at low temperatures. The mixture is then heated to a temperature between about 0° C. and about 200° C. and preferably between about 25° C. and about 150° C. During the polymerization, some type of agitation is preferable but not essential. As the polymerization proceeds, a maximum pressure is soon reached which subsequently slowly subsides. When the pressure ceases to drop, the heating is discontinued, and the gaseous materials, such as unreacted monomers which may be present, are bled from the autoclave. These may, if desired, be distilled to separate and recover the unreacted monomer. The product of the polymerization is stripped of the excess phosphorus halide and solvent by heating.

The low molecular weight polymer, i.e., oils, greases and waxes, may be purified, if desired by distillation. The polymer may also be recovered as an acid, for example, a phosphorus acid, if it is desirable to purify the product under hydrous conditions, such as steam distillation, ether extraction from aqueous solutions, or precipitation from aqueous mixtures.

In another embodiment of the invention, the polymerization may be carried out by means of a continuous process comprising feeding the reactants into a reaction zone at a rate determined to maintain constant proportions of the constituents in the mixture and to produce a residence time of about ½ to 10 hours, preferably about 1 to about 4 hours. The apparatus may be modified so that each ingredient is added individually, or the catalyst may be dissolved in the phosphorus halide, or each may be dissolved in a suitable solvent, or the catalyst and the phosphorus halide may exist in the same solution.

More particularly in a continuous system, reagent tanks for the catalyst, phosphorus halide and the monomer, pipe coil reactor in a heating bath and a cooling coil leading to a product storage tank are used. Nitrogen pressure may be applied to the reagent tanks or to the unit as desired.

The mol ratio of phosphorus halide to monomer employed in these procedures is between about 1:100 and about 20:1, preferably between about 1:20 and about 10:1, depending upon the products desired and the starting materials used. Phosphorus halide to monomer mole ratios above 1:1, generally from about 3:1 to 20:1 and higher, tend to produce polymer products in the oil to wax range of molecular weights, i.e. molecular weights up to about 4,000. Phosphorus halide to monomer mole ratios below 1:1 and as low as 1:100 tend to produce higher molecular weight solid polymer products, usually having molecular weights above about 10,000 and up to about 250,000. The molecular weight of the polymeric product generally varies inversely with the temperature and amount of catalyst used.

The polymerization may be carried out in the presence of a suitable inert solvent, if desired. The term "inert solvent" means any liquid which does not materially alter the normal polymerization of haloethylenic compounds in the presence of a phosphorus halide, including such inert solvents as Freon 113 or tetrachloroethane.

Polymerization catalysts or free radical producing catalysts which are not destroyed by phosphorus halides at temperatures within the operating range and which are soluble in one or more of the constitutents of the polymerization mixture may be used in the practice of this invention. For example, the polymerization may be carried out by catalysis with aromatic peroxides, such as benzoyl peroxide, chlorinated aromatic peroxides, such as dichlorobenzoyl peroxide, aliphatic peroxides, such as di-t-butyl peroxide, chlorinated aliphatic peroxides, such as trichloroacetylperoxide, metal compounds, such as tetraethyl lead, gases, such as oxygen, actinic light, and inorganic peroxides. Generally, the organic peroxides are preferred.

The reaction occurs essentially as shown below in a typical equation using chlorotrifluoroethylene and phosphorus tribromide as an example:

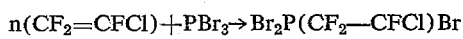

wherein $n$ is an integer from 2 to below about 30 for the distillable oils, greases and waxes. These polymeric phosphorus containing halocarbons may be separated by distillation under anhydrous conditions.

Haloethylenic monomers polymerized in the presence of phosphorus trihalides contain a $-PX_2$ terminal group which is subject to hydrolysis under conventional conditions to form an acidic polymer, i.e., a substituted phosphorus acid. Derivatives of these acids, such as amides, esters and salts, may also be obtained. Not only may the polymer be used as a starting material to form the above recited chemical combinations, but it is contemplated that it may also be used in further polymerization reactions.

The hydrolyzed terminal group of the polymer acts as a typical acid, forming metallic salts with metallic hydroxides or with free metals. If the polymer chain is not too long, i.e., not more than about 10 monomeric units, the polymer molecule may readily be brought into solution in an aqueous or aqueous alkaline media. On the other hand, the solubility of the polymer decreases as the molecular weight or chain length of the polymer increases. As the magnitude of the polymer chain becomes sufficiently great, the organic portion remains insoluble while the terminal group dissolves, and an emulsion results.

The acidic polymer is also capable of emulsifying other polymers with which it is compatible. The polymer to be emulsified is finely divided and added to an emulsion of the acidic phosphorus containing polymer or the solvent is added to a mixture of the polymers.

The acidic terminal group of the phosphorus containing polymer remains dissolved, while the finely divided polymer particles adhere to the monomer portion of the phosphorus containing polymer. An emulsifier for haloolefinic polymers may be used in the polymerization of haloolefins in aqueous media, in which adequate contact of the various components is assured. It may also be used in compounding waxes or paints in which an aqueous or alkaline solvent is desired. Or it may be used to facilitate application of a polymer to an object through spraying or dipping.

The ability of the polar terminal group to combine with metals also provides a means of securing the phosphorus containing polymer to a metal surface. The polymer is spread over the metal surface and fused or pressed. Another polymer, which is compatible with the phosphorus containing polymer, such as a solid homopolymer of trifluorochloroethylene, may then be spread over the surface and the entire polymeric film fused or pressed, thus cementing the film to the metal.

Polymerization in the presence of phosphorus halides adds not only a terminal $-PX_2$ or $-PX_4$ group to the polymer but also a halogen terminal group to the other end of the polymer chain. The presence of a chlorine terminal group is particularly advantageous when it is desirable to prepare phosphorus-containing perfluorochloro polymers. The direct addition of the chlorine during polymerization eliminates the necessity of stabilizing the polymer by further chlorination or fluorination.

The addition of a bromine or iodine is also advantageous. When various types of monomers, which are not completely halogenated are used, the halogen terminal group will form Grignard intermediates from which alcohols, esters, ethers, acids, various hydrocarbons may be formed.

It has been found that the low molecular weight polymers prepared by the process described in this invention are excellent plasticizers for high molecular weight polymers, which includes the corresponding high molecular weight polymer.

To facilitate a fuller and more complete understanding of the subject matter of this invention and how the herein described invented compounds can be prepared by practice of the present process, certain specific examples herewith follow, but it is to be understood that these examples are provided by way of illustration and should not be be considered necessarily limiting to the invention.

Example 1

A charge of 465 grams (4 moles) of trifluorochloroethylene, 550 grams (4 moles) of phosphorus trichloride and 24 grams of benzoyl peroxide was placed in a stainless steel bomb and reacted at a temperature of 100° C. for 5 hours, shaking the bomb to facilitate reaction. The pressure initially rose to 275 p.s.i., then decreased until a pressure of 130 p.s.i. was reached at the completion of the run. 105.5 grams of unreacted trifluorochloroethylene monomer was recovered. Additional phosphorus trichloride (375 grams) was added to the remaining solid material in the bomb and allowed to stand over night at room temperature, after which the bomb was heated on a steam bath. The solid polymeric product was recovered, corresponding to a conversion of 77% of the original monomer charge, was largely insoluble in $CCl_4$, benzene, ether, ethyl alcohol and acetone. Hot 5% sodium hydroxide partially disintegrated the solid, but a test of the filtrate for chloride ion was negative.

Example 2

A charge of 116 grams (1 mole) of trifluorochloroethylene, 208 grams (1 mole) of phosphorus pentachloride, and 6 grams of benzoyl peroxide (approximately 5 weight percent of monomer) was added to a stainless steel bomb and reacted at 100° C. for 5 hours with shaking of the bomb. Pressure initially rose to 260 p.s.i. then decreased to a final value of 190 p.s.i. at the end of the run. Unreacted monomer (83 grams) was recovered. The polymeric product produced corresponded to a 28% conversion of the total monomer charge.

Example 3

A charge of 271 grams (1 mole) of phosphorus tribromide, 116.5 grams (1 mole) of trifluorochloroethylene, and 6 grams of benzoyl peroxide was added to a stainless steel bomb and reacted at a temperature of 100° C. for 4 hours with shaking of the bomb. Pressure rose initially to 200 p.s.i., then decreased to 175 p.s.i. at the end of the run. Unreacted monomer (93 grams) was recovered. The polymer product, corresponding to a 20% conversion of the total monomer charge was distilled in a 6″ Vigreux column. 97% of the product boiled below 270° C. (Calculated at atmospheric pressure.)

In the polymerization process of this invention the molecular weight of the polymer product can vary within wide limits, depending on the telomerization conditions. Thus, in general a higher ratio of phosphorus halide to monomer will produce a lower molecular weight polymer. Phosphorus halide to monomer mole ratios above 1:1, generally from about 3:1 to 20:1 and higher, tend to produce polymer products in the nature of oils, greases and waxes, while phosphorus halide to monomer mole ratios below 1:1 and as low as 1:100 and lower tend to produce higher molecular weight solid polymer products. The molecular weight is also effected by the temperature and the amount of catalyst used.

To a large extent the conditions of polymerization will depend upon the olefin being polymerized and upon the technique used. For example, with perfluoroethylenes and perfluorochloroethylenes temperatures between about 80° C. and about 125° C. are most satisfactory. In a continuous system somewhat lower residence times are employed than in batch type systems because lower yields are permissible with recycle of unreacted monomer. In autogenous batch type systems the residence time is about four hours, but this depends to a large extent upon the monomer used, and may be as short as 10 minutes without departing from the scope of this invention.

It is to be understood that various modifications and alterations of conditions and techniques obvious to those skilled in the art may be made in this invention without departing from the scope thereof.

I claim:
1. A process which comprises polymerizing a perfluorohaloolefin having not more than three carbon atoms per molecule and having halogen substituents selected only from the group consisting of fluorine, chlorine and bromine at a temperature between about 0° C. and about 200° C. under substantially anhydrous conditions in contact with a free radical producing catalyst and a phosphorus halide selected from the group consisting of phosphorus bromide, phosphorus iodide and phosphorus chloride.

2. The process of claim 1 in which the mol ratio of phosphorus halide to ethylenically unsaturated monomer is between about 20:1 and about 1:100.

3. The process of claim 2 in which the ethylenically unsaturated aliphatic monomer is trifluorochloroethylene.

4. The process of claim 2 in which the ethylenically unsaturated compound is tetrafluoroethylene.

5. A process which comprises polymerizing a perfluorohaloolefin having not more than three carbon atoms per molecule and having halogen substituents selected only from the group consisting of fluorine, chlorine and bromine at a temperature between about 0° C. and about 200° C. under substantially anhydrous conditions in contact with a free radical forming catalyst and a phosphorus halide selected from the group consisting of phosphorus bromide, phosphorus iodide and phosphorus chloride, the mole ratio of phosphorus halide to monomer being between about 1:1 and about 1:100, to produce a solid polymer with a molecular weight above about 10,000.

6. The process of claim 5 wherein the phosphorus halide is phosphorus trichloride.

7. The process of claim 5 wherein the phosphorus halide is phosphorus tribromide.

8. The process of claim 5 wherein the phosphorus halide is phosphorus pentachloride.

9. An open chain polymer of a polymerizable perfluorohaloolefin having not more than three carbon atoms per molecule and having halogen substituents selected only from the group consisting of fluorine, chlorine and bromine, said polymer containing a terminal atom X and a terminal group $—PX_n$, where X is a halogen selected from the group consisting of chlorine, bromine and iodine and $n$ is an integer selected from the group consisting of 2 and 4.

10. The open chain polymer of claim 9 wherein the terminal group is $—PCl_2$.

11. The open chain polymer of claim 9 wherein the terminal group is $—PCl_4$.

12. The open chain polymer of claim 9 wherein the terminal group is $—PBr_2$.

13. A solid high molecular weight polymer having the formula $$Cl(CF_2CFCl)_nPCl_2$$

wherein $n$ is an integer above about 30.

14. A polymer having the formula $$X-(A)_cPX_{n-1}$$

wherein X is a halogen selected from the group consisting of chlorine, bromine and iodine, A is a perfluorohaloolefin monomer unit having not more than three carbon atoms, $n$ is an integer selected from the group consisting of 3 and 5, and $c$ is an integer between 2 and about 250.

15. A polymer according to claim 14 in which $c$ is an integer above about 30.

16. A polymer according to claim 14 in which A is a perfluorohaloethylene unit having halogen substituents selected only from the group consisting of fluorine, chlorine and bromine.

17. A polymer according to claim 16 in which A is a trifluorochloroethylene monomer unit.

18. A polymer according to claim 16 in which A is a tetrafluoroethylene monomer unit.

19. A polymer according to claim 14 in which A is a tetrafluoroethylene monomer unit and X is chlorine.

20. A polymer according to claim 14 in which A is a tetrafluoroethylene monomer unit and X is bromine.

21. A polymer according to claim 14 in which A is a trifluorochloroethylene monomer unit and X is chlorine.

22. A polymer according to claim 14 in which A is a trifluorochloroethylene monomer unit and X is bromine.

References Cited in the file of this patent

UNITED STATES PATENTS

| | | |
|---|---|---|
| 2,440,800 | Handford et al. | May 4, 1948 |
| 2,471,472 | Woodstock | May 31, 1949 |
| 2,489,091 | Kharasch | Nov. 22, 1949 |
| 2,562,547 | Handford et al. | July 31, 1951 |
| 2,700,661 | Miller | Jan. 25, 1955 |
| 2,786,827 | Barnhart | Mar. 26, 1957 |
| 2,811,514 | Hagemeyer | Oct. 29, 1957 |

OTHER REFERENCES

Kharasch et al.: J. Am. Chem. Soc., 67, 1864–5 (1945). Copy in Sci. Libr.